Patented Apr. 6, 1943

2,316,014

UNITED STATES PATENT OFFICE 2,316,014

TREATMENT OF COTTONSEED RESIDUE

Harold S. Olcott, Pittsburgh, Pa., assignor to Cotton Research Foundation, a corporation of Tennessee No Drawing. Application August 25, 1941, Serial No. 408,214

2 Claims. (Cl. 99—2)

This invention relates to cottonseed meal and consists in a method of procedure, whereby the meal that remains after the solvent extraction of oil from cottonseed may be rendered non-toxic without substantial loss in nutritive value, and so be made available as stock feed.

Cottonseed oil is usually obtained by expression. The seeds are de-hulled; the meats are rolled between heavy rolls, cooked in steam cookers, and formed into slabs. These slabs are wrapped in cloths, and the oil is pressed out. The cottonseed cake, however, carries residual oil—in usual practice, to the amount of 5–6%. It is used chiefly as stock feed, and is particularly valuable because of its high protein content (40–50%).

Solvent extraction is, generally speaking, more efficacious than expression; and by the method of solvent extraction with petroleum fractions the oil is commonly obtained from soya beans, flaxseed, corn, etc. The method is not, however, practised upon cottonseed. For one reason, the presence in the residue of a toxic substance, gossypol, renders the residue unusable as stock feed. Gossypol is, to be sure, soluble in most organic solvents, but not in petroleum fractions; and the petroleum fraction hexane is so far preferred that it is practically the only solvent used commercially in the United States in the solvent extraction of seed meals. Hexane is used because it can be had in pure condition, in abundant quantity, and cheaply. The solvent extraction of oil from cottonseed by means of hexane is so far efficacious that less than one percent of oil remains in the residue; but the toxic substance gossypol also remains, to render the residue unfit for feeding purposes.

In the commercial production of cottonseed oil by expression, it is the cooking procedure which is responsible for the detoxication of the gossypol, so that the cottonseed cake is suitable for a stock feed.

Similarly, I have found that by pressure cooking the cottonseed residue after hexane extraction of the oil, its gossypol content may be broken down and a non-toxic complex formed in its place; but I have also found that such treatment affects adversely the protein, and reduces the nutritive value of the residue.

This invention is based on the discovery that the detoxication of hexane-extracted cottonseed meal by moist heat is expedited by grinding the meal fine; that, other things being equal, the facility with which the gossypol may be destroyed under moist heat is in proportion to the fineness of the grinding of the meal; and that by restort to fine-grinding moist heat may be rendered effective to destroy the gossypol and in so doing to detoxify a body of meal without undue reduction in nutritive value.

It will be understood that the detoxication of the gossypol of the meal may be accomplished under varying conditions of heat (and, correspondingly, of pressure) of the steam within the autoclave. And, as a general rule, the higher the temperature the more rapidly will the detoxication be accomplished. But in order to avoid destruction of protein values, it is better to detoxify the gossypol at a lower temperature.

I have found that if the cottonseed meal be ground in a ball mill, and if the ratio in weight of balls to meal in the mill be 10:1, I can by grinding for 6 hours bring the meal to a degree of fineness such as to enable me to detoxify with moist heat, and yet have a product of adequate value as stock feed.

Specifically, I have found that by grinding the residue of the hexane extraction in a ball mill to such fineness as to pass a 325-mesh sieve, I can, by steam treatment for one hour at 100° C. detoxify the material and yet maintain its nutritive value. The good effect will not be gained if the grinding be carried no further than such as to pass a 150-mesh screen; but it will be gained if carried substantially to the degree first specified. Neither the manner nor the means of comminution are important. The fines of ordinary treatment of the residue, if sifted out, will be found to be responsive to the method of the invention. I impute this differential effect to the fact that in the particles of such minutely ground residue all of the gossypol is exposed immediately to the action of the steam and is decomposed by the steam, so that little or none of it escapes steam destruction. When the gossypol occurs dispersed in larger particles of meal, it is much more resistant to steam destruction; and, when more extreme treatments are attempted to effect such destruction, combination between gossypol and protein takes place. The gossypol-protein complex, while not toxic, is also not nutritive. Hence, the net result is a decrease in protein values.

In evidence of the value and effect of the invention as specified above two specimens of the residue of petroleum extracted cottonseed meal were ground to different degrees of fineness, one to such fineness as to pass a 150-mesh screen, but no finer, the other to a degree of fineness to pass through a screen of a degree of fineness exceeding 150 mesh and ranging from 150–325 mesh.

The two specimens of ground meal were similarly treated with steam in an autoclave for one hour at 100° C., and then the two specimens were incorporated in a quantity of 24% of the whole in diet fed to test rats. It was found by observation that the rats fed upon a diet that included the specimen of coarser grain lost weight, while those rats that were fed similarly on a diet that included the specimen of fine grain gained weight. This test indicated that in the material of coarser grain nutritive value was lost, while from the material of finer grain the toxic principle had been eliminated without prejudicial loss of nutritive value. The following tabulation summarizes the matter:

| No. rats | Mesh size | Treatment | Amt. in diet | Average change in weight (4 days) |
|---|---|---|---|---|
| 4 | 80–150 | 1 hr. at 100° | 24% | −3 gm. |
| 4 | 150–325 | 1 hr. at 100° | 24% | +13 gm. |

I claim as my invention:

1. The method herein described of processing the residue of the solvent extraction of cottonseed meal in which a petroleum fraction is the solvent, and with retention of nutritive value, which consists in comminuting the whole of the quantity of the residue to be treated substantially to a degree of fineness capable of passing a 325-mesh screen, and subjecting the comminuted material to steam treatment.

2. The method herein described of processing the residue of the solvent extraction of cottonseed meal in which a petroleum fraction is the solvent, and with retention of nutritive value, which consists in comminuting the whole of the quantity of the residue to be treated to a degree of fineness capable of passing a screen of finer mesh than 150, and subjecting the comminuted material to steam treatment.

HAROLD S. OLCOTT